United States Patent
Ollis

(10) Patent No.: US 11,718,290 B2
(45) Date of Patent: Aug. 8, 2023

(54) METHODS AND SYSTEMS FOR SAFE OUT-OF-LANE DRIVING

(71) Applicant: Argo AI, LLC, Pittsburgh, PA (US)

(72) Inventor: Mark Ollis, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 286 days.

(21) Appl. No.: 17/146,836

(22) Filed: Jan. 12, 2021

(65) Prior Publication Data

US 2022/0219682 A1 Jul. 14, 2022

(51) Int. Cl.
| | | |
|---|---|---|
| *B60W 30/09* | (2012.01) | |
| *G05D 1/02* | (2020.01) | |
| *B60W 60/00* | (2020.01) | |
| *B60W 30/095* | (2012.01) | |
| *G06V 20/58* | (2022.01) | |

(52) U.S. Cl.
CPC ........ *B60W 30/09* (2013.01); *B60W 30/0956* (2013.01); *B60W 60/0027* (2020.02); *G05D 1/0214* (2013.01); *G06V 20/58* (2022.01); *B60W 2554/20* (2020.02); *B60W 2554/801* (2020.02); *B60W 2720/10* (2013.01); *B60W 2720/12* (2013.01); *G05D 2201/0213* (2013.01)

(58) Field of Classification Search
CPC ............ B60W 30/09; B60W 60/0027; B60W 30/0956; B60W 2720/10; B60W 2720/12; B60W 2554/20; B60W 2554/801; G05D 1/0214; G06V 20/58
See application file for complete search history.

(56) References Cited

U.S. PATENT DOCUMENTS

| | | | |
|---|---|---|---|
| 8,340,883 B2 | 12/2012 | Arbitmann et al. | |
| 9,229,453 B1 | 1/2016 | Lee | |
| 9,555,801 B2 | 1/2017 | Fester et al. | |
| 9,896,095 B2 * | 2/2018 | Katoh | B60W 30/09 |
| 10,618,519 B2 | 4/2020 | Marden et al. | |
| 10,671,076 B1 * | 6/2020 | Kobilarov | G08G 1/166 |
| 10,679,497 B1 | 6/2020 | Konrardy et al. | |

(Continued)

OTHER PUBLICATIONS

Xu, W et al., "Motion Planning Under Uncertainty for On-Road Autonomous Driving".

(Continued)

*Primary Examiner* — Tarek Elarabi
(74) *Attorney, Agent, or Firm* — Fox Rothschild LLP

(57) ABSTRACT

Systems and methods are provided for navigating a vehicle to veer around a lane obstruction safely into a neighboring lane. The system may plan a trajectory around the obstructed lane. Over a temporal horizon, the system determines temporal margins by measuring an amount of time between a predicted state of a moving actor in the neighboring lane and a predicted state of the vehicle. The system identifies a minimum temporal margin of the temporal margins and determines whether the minimum temporal margin is equal to or larger than a required temporal buffer. If the minimum temporal margin is equal to or larger than the required temporal buffer, the system generates a motion control signal to cause the vehicle to follow the trajectory to veer around the obstruction into the neighboring lane. Otherwise, the system generates a motion control signal to cause the vehicle to reduce speed or stop.

20 Claims, 6 Drawing Sheets

(56) References Cited

U.S. PATENT DOCUMENTS

| | | | |
|---|---|---|---|
| 2009/0088925 A1* | 4/2009 | Sugawara | B60W 30/12 |
| | | | 340/436 |
| 2015/0251656 A1* | 9/2015 | Yester | B60W 30/09 |
| | | | 701/41 |
| 2017/0021829 A1* | 1/2017 | Nishimura | B62D 6/00 |
| 2019/0016338 A1* | 1/2019 | Ishioka | G08G 1/167 |
| 2019/0061765 A1 | 2/2019 | Marden et al. | |
| 2019/0389459 A1* | 12/2019 | Berntorp | B60W 30/18163 |
| 2020/0089245 A1* | 3/2020 | Yadmellat | B60W 60/0011 |
| 2020/0258390 A1 | 8/2020 | Raichelgauz et al. | |
| 2020/0301435 A1* | 9/2020 | Phillips | G05D 1/0214 |
| 2022/0169281 A1* | 6/2022 | Lin | G06V 20/588 |

OTHER PUBLICATIONS

Smith, D. et al., "Feasibility of Modeling Lane-Change Performance," 2003-01-0280.

* cited by examiner

METHODS AND SYSTEMS FOR SAFE OUT-OF-LANE DRIVING

BACKGROUND

Navigation of automated vehicles relies on tracking detected objects ahead of the vehicle's position in a lane and/or road users amongst multiple lanes. Accurate tracking of objects in the lane in which the vehicle is traveling or will travel is essential for systems such as cruise-control, collision avoidance/mitigation or emergency braking.

Vehicles may need to veer out of their planned lane to avoid obstacles ahead of them. However, an automated vehicle may be programmed to travel along a lane based on the detected edges and boundaries, for example, to prevent an out-of-lane violation. Typically, when an automated vehicle encounters a parked object, its initial assessment of the situation may be to slow or stop. However, an automated vehicle could be stopped for a long period of time when this happens. For example, in cities, delivery trucks may park on the side of the road, but a portion of the truck's body occupies a portion of the road. If the automated vehicle were to remain stopped behind the parked delivery truck until the truck moves from its location, it would delay travel of the vehicle and create additional traffic congestion.

Consequently, there is a need to identify times when a vehicle can veer out-of-lane safely. This document describes methods and systems that are directed to addressing the problems described above, and/or other issues.

SUMMARY

In various scenarios, in a method to assist in navigating a vehicle around obstacles, one or more sensors of a perception system of an automated vehicle may obtain data representative of an obstructed lane condition in a first lane traveled by the automated vehicle and data representative of a moving actor in a second lane neighboring the first lane. A system that includes a computing device of the vehicle will include programming instructions that are configured to cause a processor of the system to cause a motion control system of the vehicle to move the vehicle in a first lane. The system receives, from the sensors, real-time sensor data corresponding to an obstructed lane condition in the first lane. The system receives, from the sensors, real-time sensor data corresponding to a moving actor in a second lane neighboring the first lane. The system may plan a trajectory of the vehicle around the obstructed lane condition. The trajectory may include one or more locations in the second lane. For each of a plurality of times $t_n$ over a temporal horizon, the system may determine a temporal margin by measuring an amount of time each between a predicted state of the moving actor at the time $t_n$ and a predicted state of the automated vehicle. The system may identify a minimum temporal margin of the determined temporal margins and determine whether the minimum temporal margin is equal to or larger than a required temporal buffer. If the minimum temporal margin is equal to or larger than the required temporal buffer, the system may generate a motion control signal to cause the automated vehicle to follow the trajectory and veer around the obstructed lane condition into the second lane. Otherwise, the system may generate a motion control signal to cause the automated vehicle to reduce speed or stop.

In some scenarios, when the minimum temporal margin is not equal to or larger than the required temporal buffer, the system may cause the automated vehicle to reduce speed of the automated vehicle while continuing to monitor the moving actor.

In some scenarios, as the system continues to monitor the moving actor, the system may further determine updated temporal margins at each time $t_n$ over an updated temporal horizon, identify an updated minimum temporal margin of the updated temporal margins, and determine whether the updated minimum temporal buffer is equal to or larger than the required temporal buffer.

In some scenarios, the system may determine the required temporal buffer as a function of a lateral distance that the automated vehicle may veer into the second lane.

Additionally or alternatively, the system may determine the required temporal buffer as a function of a speed of the automated vehicle.

In some scenarios, the system may determine a start time along a portion of the trajectory. The start time may correspond to a first location of the one or more locations on the trajectory. The system may determine an end time along the portion of the trajectory. The end time corresponds to a last location of the one or more locations on the trajectory. The system may determine the temporal horizon as a measure of time between the start time and the end time.

In a process to determine temporal margins, the system may determine the temporal margin for each of the plurality of times $t_n$ over the temporal horizon by: a) determining the predicted state of the moving actor at each time $t_n$ over the temporal horizon; b) determining a first time that the predicted moving actor state will be less than a threshold safe distance from the automated vehicle when the automated vehicle follows the trajectory into the second lane; and c) for each time $t_n$, measuring the temporal margin as a measure of time between a) and b).

In some scenarios, the system may use the obtained data of the moving actor to classify the moving actor. The system may use the obtained data of the obstructed lane condition to classify an object in the first lane is causing the obstructed lane condition.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

As used in this document, out-of-lane departure is defined as a maximum distance that an automated vehicle will move into an adjacent neighboring lane when following a planned trajectory.

An obstructed lane condition is defined as a situation in which a stationary object occupies a portion of the lane in which an automated is traveling, and in a position where the vehicle must veer to avoid collision with the object. The lane obstruction may be any of a stopped or parked vehicle, an object, a road hole, pedestrian, actor and standing water. A vehicle may include, without limitation, a bus, automobile, a bicycle, truck, motorcycle, and a scooter.

Definitions for additional terms that are relevant to this document are included at the end of this Detailed Description.

An automated vehicle operating in an environment may use sensors to automatically identify lane conditions in the environment, and navigate the automated vehicle to avoid a detected obstructed lane condition which may result in a collision or impact with the obstructed lane condition. For avoiding a collision with a detected obstructed lane condition, it is often also important to identify if the vehicle can travel around the detected lane condition. Consequently, the automated vehicle may need to take action (e.g., for collision or impact avoidance) by veering safely into a portion of the neighboring lane to avoid the obstructed lane condition.

The methods and systems of the present disclosure describe determining a point in time over a horizon that there is a safe distance between a moving actor in a neighboring lane and a vehicle to make a maneuver safely into a portion of the neighboring lane to avoid an obstructed lane condition. The methods and systems described in this disclosure are robust to situations for safely veering around stopped vehicles, obstructing objects, holes in the road, and standing water, by way of non-limiting example. The methods and systems will be described in relation to FIGS. 1-6.

The method blocks may be performed in the order shown or a different order. One or more of the blocks may be performs contemporaneously. Furthermore, one or more blocks may be added or omitted.

Figure 1:
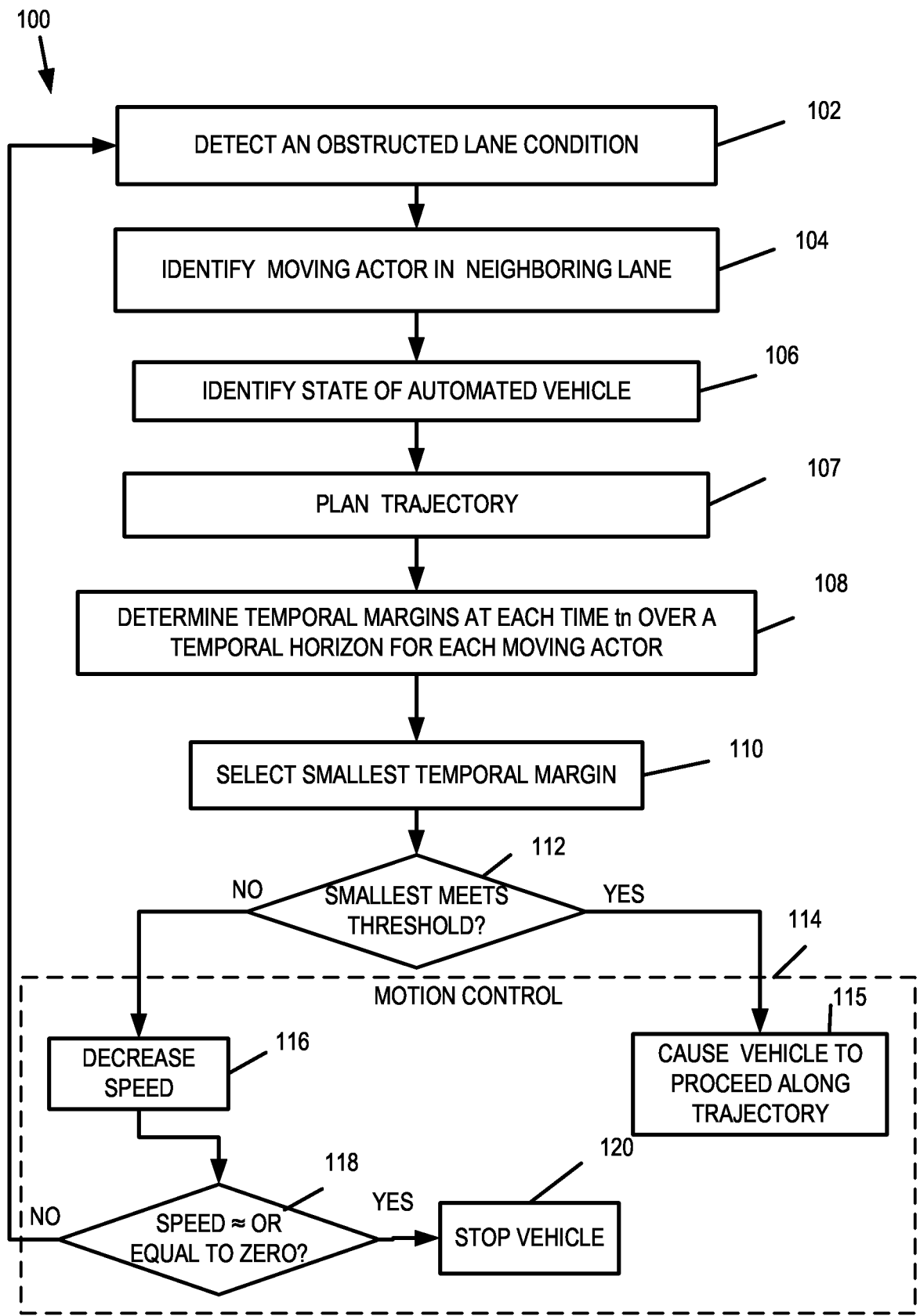
FIG. 1 illustrates a flow chart of an example process for determining a safe out-of-lane departure of an automated vehicle.
Figure 3:
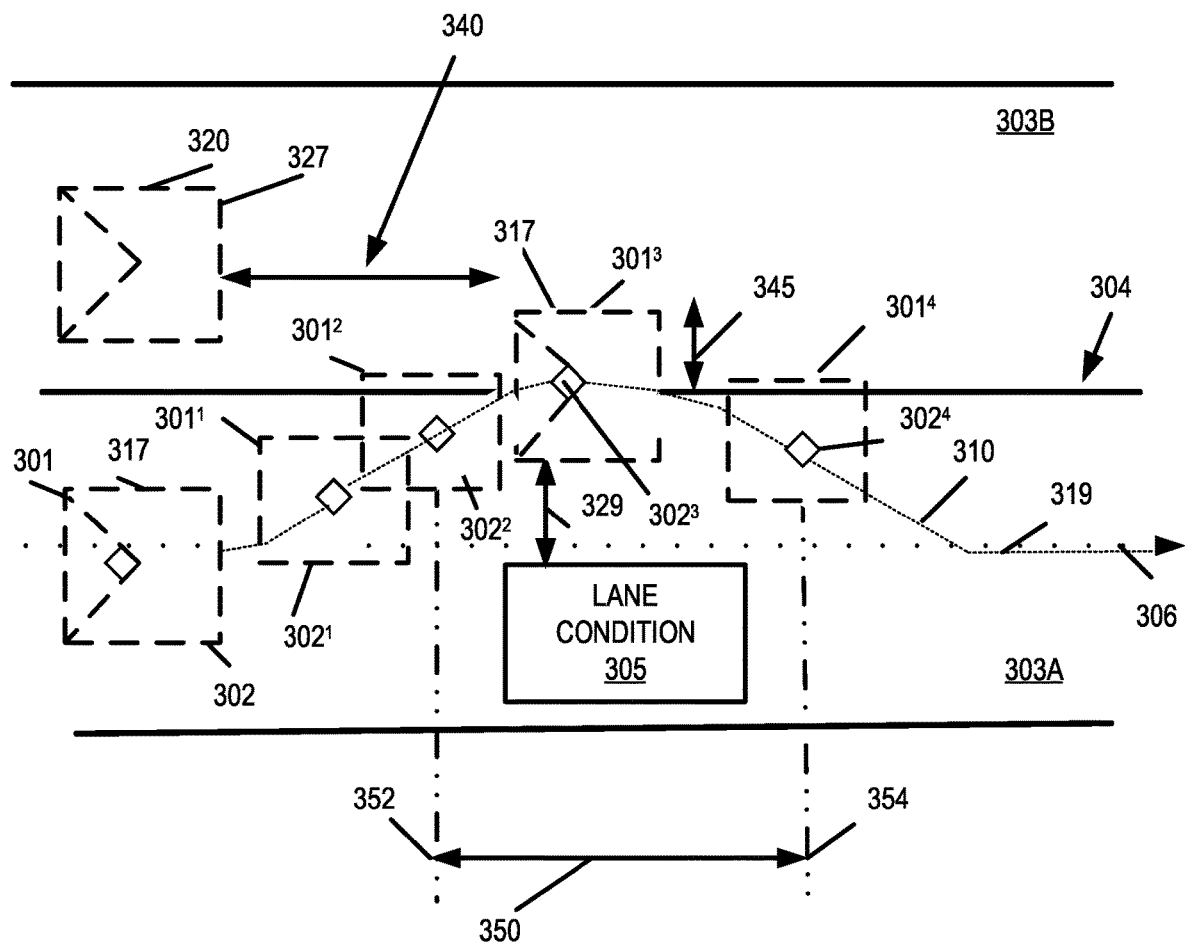
FIG. 3 illustrates example predicted states of an automated vehicle along a planned trajectory with an out-of-lane departure into a neighboring lane relative to a temporal margin with a moving actor.
Figure 4:
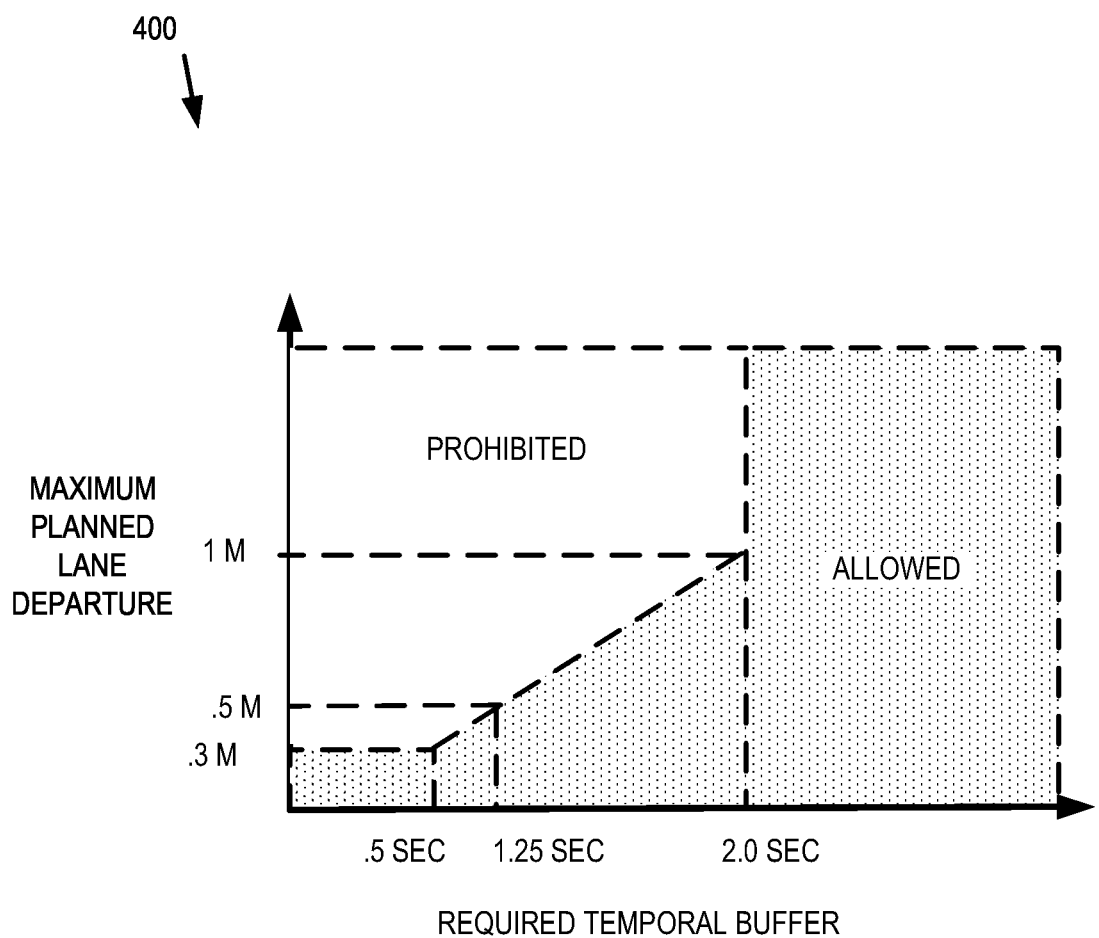
FIG. 4 illustrates an example graph of the relationship between the required temporal buffer and a degree of automated vehicle lane movement into a second lane.
Figure 5:
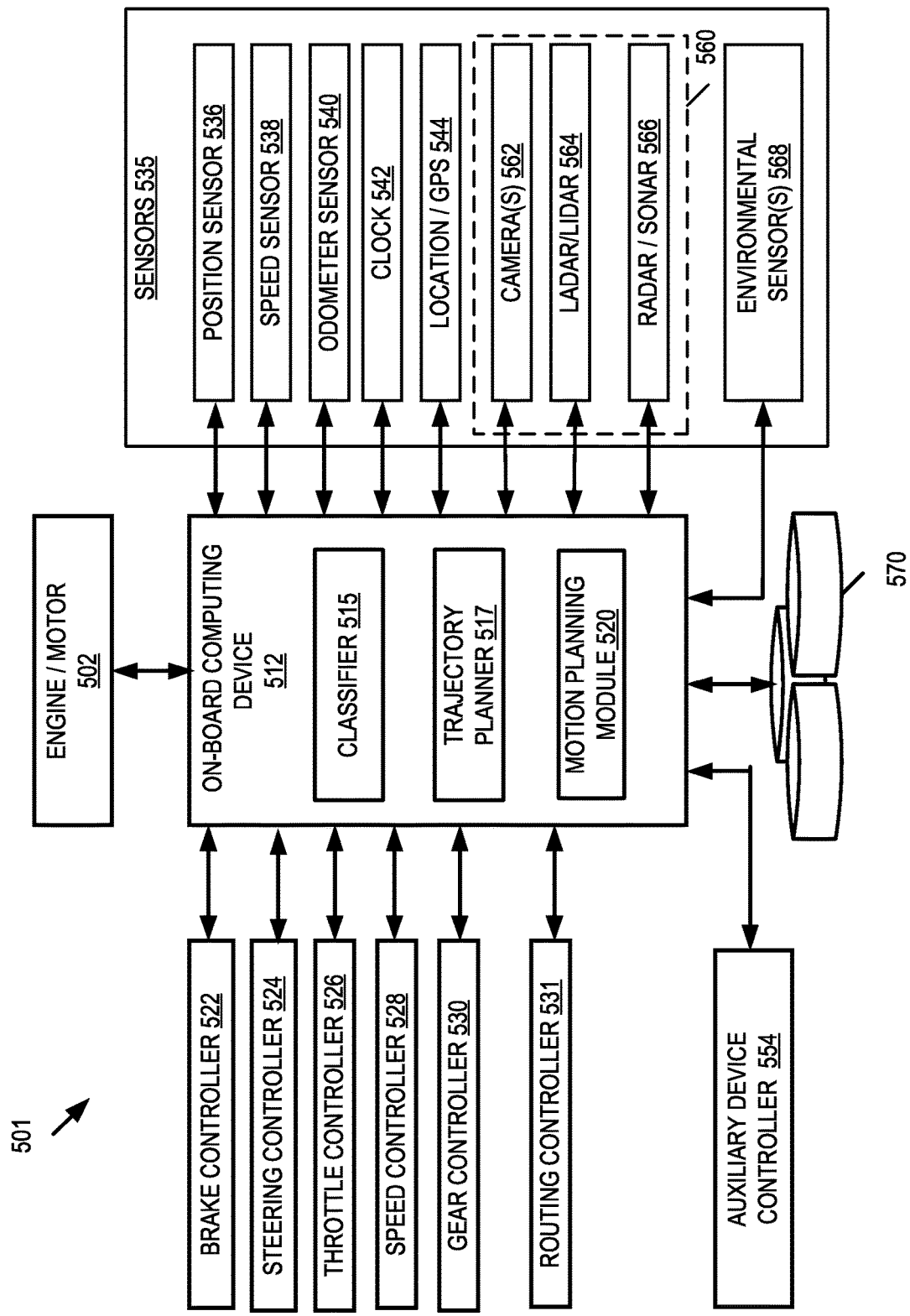
FIG. 5 illustrates an example architecture of a vehicle controller system.
Figure 6:
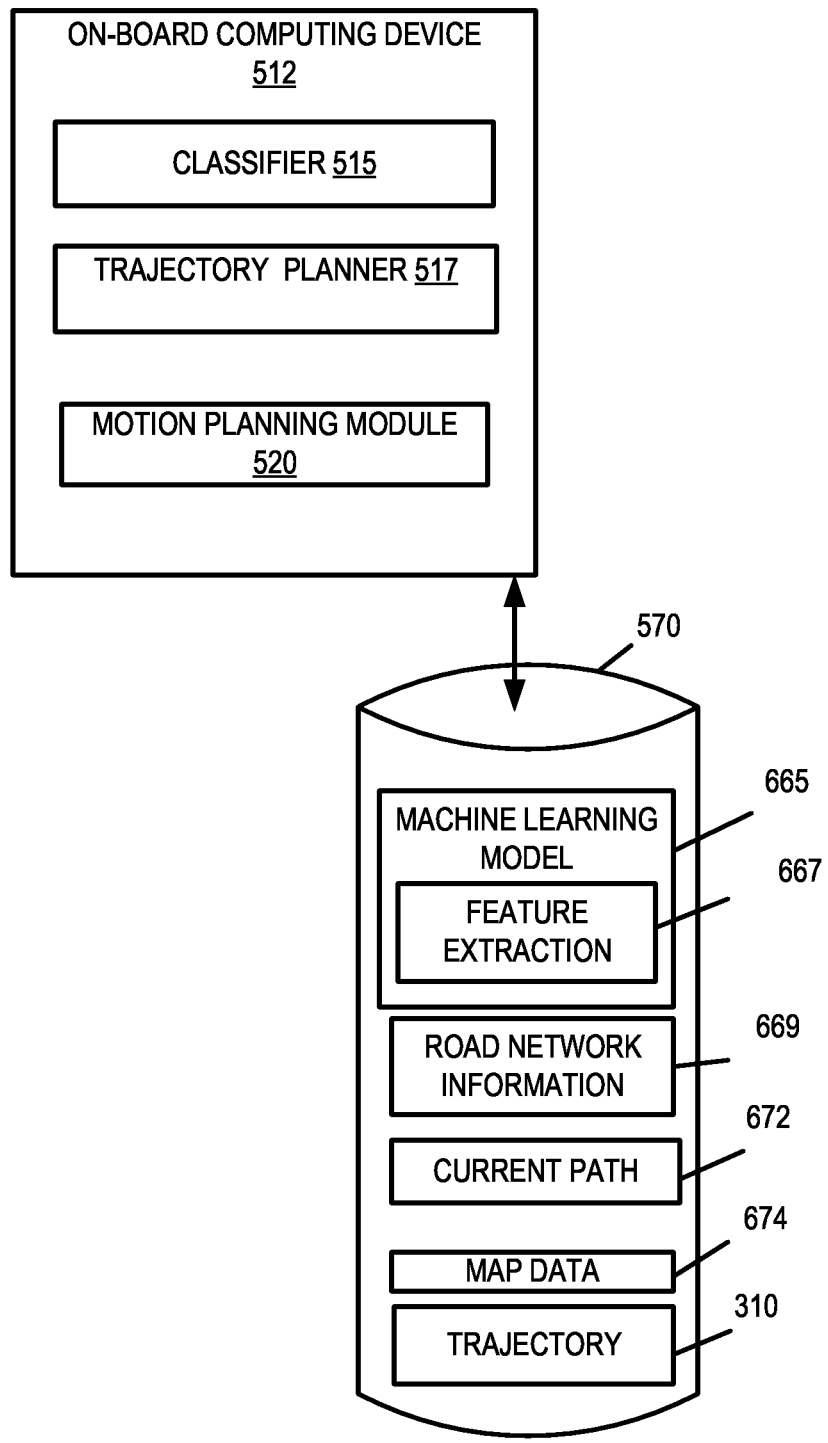
FIG. 6 illustrates an example architecture of an on-board computing device.

FIG. 1 illustrates a flow chart of an example process 100 for determining a safe out-of-lane departure of an automated vehicle 301 (FIG. 3) according to an implementation. The process 100 will be described with reference to illustrations of FIGS. 3-6. FIG. 3 illustrates example predicted states of an automated vehicle 301 along a planned trajectory with an out-of-lane departure into a neighboring lane 303B relative to a temporal margin 340 with a moving actor. FIG. 4 illustrates an example graph 400 of the relationship between a required temporal buffer and a degree of automated vehicle out-of-lane departure. FIG. 5 illustrates an example architecture of a vehicle controller system 501 used to control the navigation of an automated vehicle 301. FIG. 6 illustrates an example architecture of on-board computing device 512 of the vehicle controller system 501.

At 102, the system 501 detects an obstructed lane condition 305 in lane 303A ahead of and in the same lane as an automated vehicle 301 for which an automated vehicle 301 may be able to move out of the lane 303A into a portion of a neighboring lane 303B. By way of non-limiting example, the vehicle 301 includes one or more sensors 535 that will be described in relation to FIG. 5 that includes a computer vision system 560 with machine learning algorithms to detect and classify actors and other objects in the environment.

An obstructed lane condition 305 is detected by the system 501 by i) detecting an object ahead of the automated vehicle 301; ii) determining that the object is in the same lane 303A as the current lane that the automated vehicle 301 is traveling; and iii) detecting that object is stationary (i.e., zero speed). The system 501 may use a trained machine learning model 665 (FIG. 6) employing feature extraction algorithms 667 for detecting and also classifying the object and determining the speed of the object. The feature extraction algorithms 667 may include, without limitation, edge detection, corner detection, template matching, dynamic texture processing, segmentation image processing, motion detection, object tracking, background subtraction, object recognition and classification, etc.

For example, system 501 may detect an object within the environment (i.e., within a certain distance) of the automated vehicle 301 and assign the object a lane. This detection may be made based on real-time sensor data output from the object detection sensors (e.g., object detection sensors of the computer vision system 560 of FIG. 5 below). The system 501 may also use the received sensor data to determine current state information about the detected object such as, without limitation, a speed of the object, object classification, a direction of travel of the object, pose (including heading and/or orientation), alignment of the object with respect to one or more lanes from road network information 669 and around the object's location, or the like.

Classifier 515 of the on-board computing device 512 may be configured to perform object classification. For example, object classification may be performed to classify the detected object into one of a plurality of classes and/or sub-classes. The classes can include, but are not limited to, a vehicle class, object class and a pedestrian class. Any vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The classifier 515 may be configured to perform vehicle classification based on sensor data output from, for example, an object detection sensor such a laser detection and ranging (LADAR) system and/or light detecting and ranging (LIDAR) system 564, a radio detection and ranging (RADAR) system and/or a sound navigation and ranging (SONAR) system 566, and one or more cameras 562 (e.g., visible spectrum cameras, infrared cameras, etc.) of the system 501. Any now or hereafter known object classification techniques can be used such as, without limitation, point cloud labeling, machine learning algorithms for shape/pose estimation, feature comparisons, or the like. The classifier 515 may be configured to perform object class classification. Objects may include objects that are commonly found around roadways, such as garbage cans, debris, vehicle parts (i.e., tires, tire parts, fenders), glass, boxes, furniture, water, holes, etc. The classifier 515 may be configured to perform pedestrian classification based on individual classes.

To determine whether an obstructed lane condition 305 exists, the system 501 may also identify whether the object also occupies locations of a stored current path 672. The current path 672 (FIG. 6) of the system 501 corresponds to a set of locations along a trajectory that the on-board computing device 512 intends the vehicle to follow as it travels along the current road or lane of a road network. Accordingly, the system 501 may determine whether the object (i.e., vehicle, object, pedestrian) is stationary or stopped and in the same lane of travel by the automated vehicle 301. Feature extraction algorithms for motion detection may determine that the detected object of the obstructed lane condition 305 remains stationary in a sequence of frames of captured images by the computer vision system 560.

At 104, the system 501 identifies one or more moving actors 320 in a neighboring lane 303B. The system 501 may identify one or more moving actors, such as vehicles or pedestrians and assign the moving actor a corresponding lane, if appropriate. For example, the computer vision system 560 may detect actors, such as moving vehicles or pedestrians, in a neighboring lane. The classifier 515 of the system 501 may classify moving actors according to one or more classes or sub-classes that may include, but are not limited to, a bicycle sub-class, a motorcycle sub-class, a skateboard sub-class, a roller blade sub-class, a scooter sub-class, a sedan sub-class, an SUV sub-class, and/or a truck sub-class.

At 106, the system 501 identifies the state of operation of the automated vehicle 301, based on the one or more sensors 535. The state of operation of the automated vehicle 301 includes, among other things, the current speed and the current direction, for example, based on sensor data from the speed sensor 548 and the location sensor 544. The state of the automated vehicle 301 may include alignment of the vehicle body with a lane (i.e., the heading/orientation with respect to a lane), direction of travel, speed and/or acceleration, and heading and/or orientation. The system 501 includes various sensors 535 for collecting real-time data associated with the automated vehicle to which the sensors 535 are attached.

At 107, the system 501 plans a path 310 via a trajectory planner 517 (FIG. 6) around the obstructed lane condition 305. The trajectory 310 corresponds to the predicted future states of the automated vehicle 301 around the obstructed lane condition, including, without limitation, for a particular vehicle's speed, direction, pose and location. The trajectory 310 created by the trajectory planner 517 may include one or more locations into a neighboring lane 303B of a road network by crossing the dividing line. The trajectory 310 navigates the automated vehicle 301 around the obstructed lane condition 305 but also causes the vehicle to move at least partially into one or more locations of the neighboring lane. Each location of the trajectory 310 may be stored in a data store 570 (FIG. 5) or memory device. Each departure that is in the neighboring lane may include a maximum planned lane departure distance 345 (FIG. 3) corresponding to an amount by which the autonomous vehicle will move into the second lane at such location. The trajectory 310 may be based on the current path and allows for a departure into a neighboring lane to safely pass a obstructed lane condition. The trajectory planner 517 will be described in more detail in relation to FIGS. 3 and 6. The trajectory 310 may be determined using an algorithm that generates a clearance 329 or gap between one side of the vehicle body 317 being adjacent to the passing side of the object causing the obstructed lane condition 305 which the automated vehicle 301 will move around. In some embodiments, the clearance 329 or gap may vary based on the object classification of the object causing the obstructed lane condition. Thus, the trajectory 310 may depend on the classification of the object causing the obstructed lane condition. By way of non-limiting example, the clearance 329 between the obstructed lane condition and automated vehicle may be based on the object's classification. If the obstructed lane condition is a truck with one side door on the passing side, the gap between the vehicle and the truck may be determined based on avoiding a collision if the truck's side door is open on the passing side while the vehicle 301 is in the process of passing the truck. The trajectory planner 517 may be interfaced with the motion planning module 520 to generate a trajectory with a forward motion plan for navigating the automated vehicle around the obstructed lane condition, in response to the determined clearance.

At 108, the system 501 may determine temporal margins 340 (FIG. 3) at each time $t_n$ over a temporal horizon of time for each moving actor 320. The temporal margins 340 are stored in a list. In some embodiments, the list may be ranked. The process for determining the temporal margins 340 will be described in relation to FIG. 2.

Figure 2:
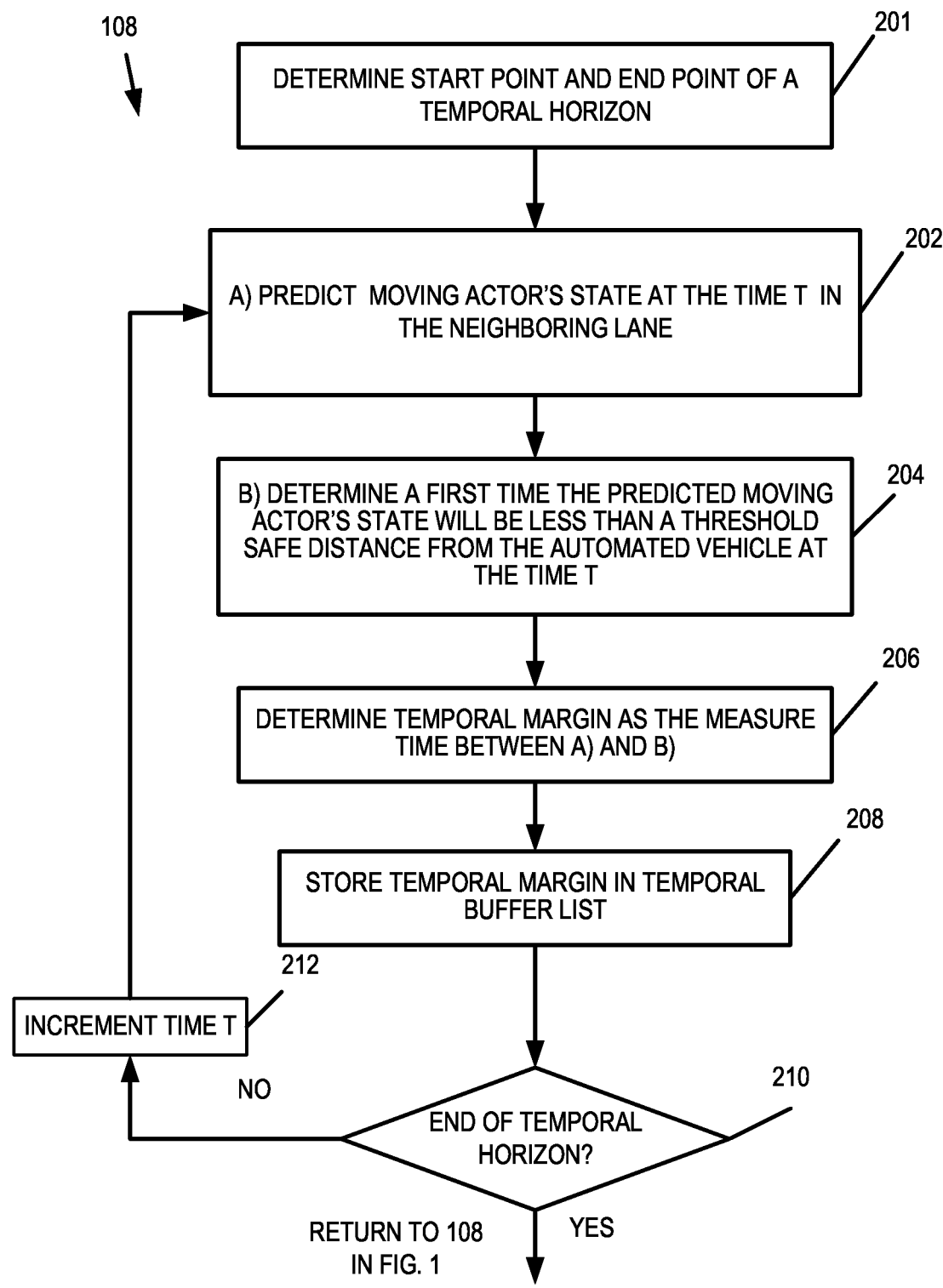
FIG. 2 illustrates a flow chart of an example process for determining a temporal margin.

With specific reference to FIG. 2, a flow chart of an example process 108 for determining a temporal margin 340 (FIG. 3) is illustrated. At 201, the system 501 may determine a temporal horizon 350, based on the planned trajectory 310. The temporal horizon may include a measure of time between a start time 352 and an end time 354 on the planned trajectory 310 for those locations in which the automated vehicle will be at least partially in the neighboring lane when following the trajectory. For purposes of illustration and by way of example, assume that the referenced start time 352 is defined as a first point in time the automated vehicle enters the neighboring lane 303B on the planned trajectory 310. Assume for illustrative purposes, the start time corresponds to reference point $302^2$ but may start earlier than the actual start point shown. The end time 354 is defined as the last point in time that the vehicle will be in the neighboring lane 303B on the planned trajectory 310. Assume for illustrative purposes, the end time corresponds to reference point $302^4$ but may end later than the point shown. Accordingly, the start time 352 and an end time 354 are based on the predicted automated vehicle states at locations along the trajectory 310 where the predicted vehicle body at those locations has an out-of-lane departure. The start time 352 may correspond to a first location that causes an out-of-lane departure. The end time 354 may correspond to a last location that causes an out-of-lane departure.

At 202, the system 501 may A) predict the moving actor's state at the time t in the neighboring lane. As previously described, the system 501 may use the classifier 515 to classify the moving actor in the neighboring lane using data from the computer vision system 560. The moving actor's state may include one or more of the moving actor's speed and direction. The moving actor's state may include the actor's pose. Predicting a moving actor's state may include predicting an actor's trajectory.

The moving actor classification performed by the classifier 515 may be made based on sensor data output from, for example, an object detection sensor such as a LADAR or LIDAR system 564, RADAR or SONAR system 566, and/or a camera 562 of the computer vision system 560. Any now or hereafter known object classification techniques can be used such as, without limitation, point cloud labeling, machine learning algorithms for shape/pose estimation, or the like. The system may detect a moving actor within the environment (i.e., within a certain distance) of the automated vehicle 301. This detection may be made based on real-time sensor data output from the object detection sensors of the computer vision system 560 of an automated vehicle 301.

The system 501 may also use the received sensor data to determine current state information about the detected moving actor 320 such as, without limitation, a speed of the object, object classification, a direction of travel of the object, pose (including heading and/or orientation), alignment of the object with respect to one or more lanes of the road network and around the object's location, or the like. Road network information 669 is stored in data store 570 or memory device. Object classification by classifier 515 was previously described and include machine learning with feature extraction algorithms and object classes and subclasses. Examples of states of a moving actor may include, without limitation, extent or percentage of overlap of the actor with a lane, alignment of the actor with a lane (i.e., the heading/orientation of the actor with respect to a lane), object classification, direction of travel, speed and/or acceleration, heading and/or orientation, or the like.

At 204, the system 501 may B) determine a first time the predicted moving actor state will be less than a threshold safe distance from the automated vehicle 301 (i.e., the predicted automated vehicle state) at the time t. (In this context, the term "first" does not necessarily require that it is the actual first time that the vehicle is in the state, but instead is a term of relative order with respect to a subsequent "last" time such that the "first" and "last" times simply define the boundaries of a time horizon.) The predetermined threshold safe distance may be a parameter or variable, as will be discussed later in more detail. For the sake of discussion, the threshold safe distance may be 50 cm. However, the actual distance used in practice is not limited to this value.

At 206, the system 501 may determine a temporal margin as the measure of time between A) and B) (i.e., between (A) the time at which the moving actor will be in the state determined at step 202 and (B) the time at which the moving actor will be within the threshold safe distance as determined at step 204). At 208, the system 501 may store the temporal margin in a temporal buffer list or other format in a date store. At 210, the system 501 may determine if the end of a temporal horizon is complete. If the determination is "NO," the system 501 (at 212) may increment time t and repeat the process 108 to determine the temporal margins at each corresponding time t over the temporal horizon that is between the automated vehicle state and a predicted automated vehicle state along the trajectory 310 during which the automated vehicle will be in the neighboring lane. The increment in time t may be one second, or a fraction of a second, or any other time interval. If the determination is "NO," the system 501 may return to FIG. 1 at 108. At 110 of FIG. 1, the system 501 may select the smallest temporal margin from the temporal buffer list.

The temporal horizon 350 may be, for example, ten seconds or more, and will be described in more detail in relation to FIG. 3.

Using this value as an example, if the system of a temporal margin uses a threshold safe distance of 50 centimeters (cm), if the automated vehicle 301 trajectory will place the vehicle out-of-lane in some location at time t, and a predicted moving actor state comes within 50 cm of the predicted autonomous state at time t+1.8, then the temporal margin for the moving actor at the time t is 1.8 seconds.

If, for all time where the automated vehicle plans to be in an out-of-lane departure, there are no predicted moving actor states at any time that comes within the threshold safe distance, the temporal buffer would be infinite.

Returning again to FIG. 1, at 112, the system 501 determines whether the smallest temporal margin meets a safe distance threshold that corresponds to a required temporal buffer, as shown in a graph of FIG. 4. The required temporal buffer is a threshold that predicts a safe out-of-lane departure. In order to proceed, all temporal margins must meet or exceed the safe distance threshold for the required temporal buffer.

The decision (at 112) allows the system 501 to control the navigation and motion of the automated vehicle (at 114). If the determination is "YES," the system 501 (at 115) controls the automated vehicle 301 to veer such as by generating a veering (steering) control signal by an on-board computing device 512 according to the trajectory 310. The veering control signal may control the automated vehicle 301 to veer around the obstructed lane condition 305 and into at least a portion of the neighboring lane 303B. By way of non-limiting example, the veering control signal may be sent to the steering controller 524 (FIG. 5) by the on-board computing device 512. For example, the on-board computing device 512 may provide the trajectory 310 to the routing controller 531 to assist in departing the current path and implementing the trajectory 310.

If the determination is "NO," the system 501 (at 116) may decrease the speed of the automated vehicle 301 and/or may follow the trajectory but not to the extent of crossing into a neighboring lane. For example, the on-board computing device 512 of the system 501 may generate a speed control signal that is sent to the speed controller 528 (FIG. 5) to reduce the speed. In some embodiments, these control signals may generate a braking control signal that is sent to the braking controller 522 (FIG. 5) to reduce the speed. Furthermore, if the determination is "NO," the system 501 (at 116) may decrease the speed of the automated vehicle 301 and/or may follow another selected trajectory. In some embodiments, the system may evaluate multiple trajectories that may include, for example, selecting a hard stop or a soft stop.

At block 118, the system 501 may determine whether the speed is approximately or equal to zero, such as by receiving the current speed data from the speed sensor 538. If the determination is "YES," the system 501 (at 120) may control the automated vehicle 301 to stop, such as by generating a braking control signal to control the brake controller 522, as described above, prior to collision or impact with the object causing the obstructed lane condition 305. If the determination is "NO," the system 501 may return to continue to detect the obstructed lane condition 305 (at 102) which may change over time such as before the need to stop or veer around the obstructed lane condition. For example, if the object causing the obstructed lane condition 305 is a stopped vehicle, the stopped vehicle may move such that the obstructed lane condition 305 is resolved so that the lane becomes clear to proceed along by the automated vehicle. In other scenarios, the lane obstruction may be removed. In other examples, the temporal margins are updated based on the reduced (revised) speed of the automated vehicle 301. However, the planned trajectory 310 including the locations causing the out-of-lane departure may remain essentially the same except a time of arrival may be delayed. Accordingly, the start time and end time of the temporal horizon of time may change based on the predicted time of arrival of the automated vehicle at the locations in the trajectory. Likewise, the temporal margins may be updated.

The system 501 may be configured to cause the automated vehicle 301 to slow down for the obstructed lane condition 305 until it is either safe to veer around the obstructed lane condition 305 or stop. It should be understood that if it is not safe for the automated vehicle to veer around the obstructed lane condition 305, the temporal margin 340 is too small for the present conditions to perform a safe out-of-lane departure. The automated vehicle 301 may be caused to start to slow down for a few cycles. As a consequence, slowing down the automated vehicle for multiple cycles, until the traffic in the neighboring lane 303B gets sufficiently out of the planned trajectory, may cause the calculated temporal margin to increase. Accordingly, at the time (traffic is sufficiently out of the planned trajectory 310), the system 501 may choose the trajectory 310 to veer around the obstructed lane condition 305 once the increased temporal margin is the same as or larger than the required temporal buffer that predicts a safe out-of-lane departure.

The process 100 is repeated for each moving actor in the neighboring lane that the automated vehicle defects may affect its out-of-lane departure. If the temporal margins for all the moving actors 320 are larger than the required buffer, the trajectory 310 is safe and the system 501 will control the automated vehicle 301 to drive the trajectory 310. For example, the system 501 will generate a steering (veering) control signal that causes the automated vehicle 301 to drive around the object causing the obstructed lane condition 305 in a manner, which avoids collision with both the obstruction causing the obstructed lane condition 305 and the moving actor 320.

The process 100 may be implemented using hardware, firmware, software or a combination of any of these. For instance, process 100 may be implemented as part of a microcontroller, processor, and/or graphics processing units (GPUs) and an interface with a register and/or data store 570 (FIG. 5) for storing data and programming instructions, which when executed, performs the process 100 described.

The inventors have determined that the process 100 is computational-efficient. In various embodiments, only one trajectory 310 around the obstructed lane condition 305 may need to be generated. However, if the vehicle is reduced in speed, the time of arrival of the vehicle in predicted automated vehicle states may be updated. If the process 100 causes the automated vehicle 301 to slow down until the neighboring lane is clear and then veer around the obstructed lane condition 305 at that time, the process 100 is emergent and requires substantially less computation than would be required if the system 501 tried to plan the entire behavior ahead of time. For example, in this case, the system 501 does not have to perform explicit computation to decide how long to wait before veering into the neighboring lane, as will be described in more detail in relation to FIG. 3.

With specific reference to FIG. 3, the automated vehicle 301 has a reference point 302 relative to the vehicle body 317. The reference point 302 may define distances from the reference point to each point on the exterior of the vehicle body 317. The planned trajectory 310 in this case has an out-of-lane departure into a neighboring lane 303B in order for the automated vehicle 301 to avoid collision or impact with the obstructed lane condition 305. The obstructed lane condition 305 is represented in a box. For the sake of illustration, assume that the box represents an area occupied by the obstructed lane condition 305. Thus, to avoid a collision or impact with the obstructed lane condition 305, the vehicle 301 needs to veer around the area occupied by the obstructed lane condition 305. In this case, the obstructed lane condition 305 narrows the width of lane 303A to the dividing line 304. As previously described, a clearance 329 may be established between the vehicle 301 and passing side of the obstructed lane condition 305. The lane 303A is a first lane and may correspond to the assigned lane of travel by the vehicle 301. The neighboring lane 303B is a second lane and corresponds to the lane, which may be assigned to the object. The first and second lanes are adjacent and generally parallel to each other.

In the illustrated example, assume that from reference point 302, the plan trajectory 310 for the path of the automated vehicle 301 has been planned such that a path departure portion gradually advances the automated vehicle toward the dividing line 304 into the neighboring lane 303B so that the automated vehicle avoids collision or impact with surfaces of lane condition 305 along each point or location of the planned trajectory 310. The planned trajectory 310 also includes a path overlapping portion at or near the dividing line 304 such that the vehicle body overlaps into the neighboring lane 303B. The path overlapping portion may correspond to the temporal horizon. The planned trajectory 310 also includes a lane return portion to return the automated vehicle to the center 306 of the lane 303A denoted as a dotted line. The dashed boxes labeled $301^1$, $301^2$, $301^3$ and $301^4$ are different predicted automated vehicle states along the planned trajectory 310 relative to reference points $302^1$, $302^2$, $302^3$ and $302^4$. The reference points $302^1$, $302^2$, $302^3$ and $302^4$ are shown occupying points or location on the planned trajectory 310.

In the example, assume for the purposes of illustration the automated vehicle 301 is traveling along a center 306 of the lane 303A. The planned trajectory 310 begins approximately in a center 306 of the lane 303A, represented by reference point 302, and returns the vehicle 301 to a center of the lane 303A at a path end 319 of the planned trajectory 310.

In the illustration, an example distance, denoted by the reference numeral 345 represents the maximum planned lane departure for the trajectory 310, which occurs, by way of example, at reference point $302^3$. The maximum planned lane departure 345 is measured from the dividing line 304 to the line of a longitudinal side of the vehicle body 317, which overlaps into that neighboring lane 303B. As best seen in FIG. 3, the distance associated with maximum planned lane departure at reference points $302^2$ and $302^4$ are smaller than the reference point $302^3$.

In the illustration, the reference point $302^1$, places the vehicle body 317 wholly in the lane 303A. The reference points $302^2$, $302^3$, and $302^4$ places a portion of the vehicle body 317 over the dividing line 304. The temporal horizon does not necessarily extend over the entire time to drive along the trajectory. Instead, temporal horizon is for that length of time the predicted state of the automated vehicle causes an out-of-lane departure of the vehicle body 317. It should be understood that some of the reference points along the planned trajectory for the automated vehicle have been omitted to prevent crowding in the figure.

The temporal margin 340 corresponds to the time between a moving actor 320 and the automated vehicle $301^3$, at reference point $302^3$. The temporal margin 340 is shown as a measured distance in time that is between the leading end (i.e., front) of the object's body 327 and a trailing end (i.e., rear) of vehicle body 317. The temporal margin 340 would be calculated for other moving actors 320 in proximity of the automated vehicle 301. The temporal margin 340 would be determined for each point in time t over the temporal horizon 350, but only one temporal margin 340 is shown. If there are multiple moving actors under evaluation during the temporal horizon, a selected temporal margin 340 (at 110) should include the smallest of all moving actors.

FIG. 4 illustrates an example graph 400 of the relationship between the required temporal buffer and a degree of automated vehicle lane planned lane departure. The graph 400 illustrates that any temporal margin over 2.0 seconds, regardless of distance, meets a safe distance requirement. The graph 400 illustrates a sloped line between 0.5 meters (m) and 1.0 m. If the maximum planned lane departure that the automated vehicle 301 will move into the neighboring lane is 0.5 m, then the minimum temporal buffer should be 1.25 seconds. If the maximum planned lane departure that the automated vehicle 301 will move into a neighboring lane is 0.5 m to 1 m, then the minimum temporal buffer should be 1.25 seconds to 2.0 seconds, respectively. If the maximum planned lane departure that the automated vehicle 301 will move into the neighboring lane is 0.3 m, then the minimum temporal buffer should be 0.5 seconds. It should be understood that the graph 400 may change based on the speed of the automated vehicle, and that the numbers used in FIG. 4 are by way of example only.

With specific reference to FIG. 5, the system 501 may include an engine or motor 502 and various sensors 535 for measuring various parameters of the vehicle and/or its environment. The system 501 may be integrated into a vehicle body. The automated vehicle may be fully autonomous or semi-autonomous. Operational parameter sensors that are common to both types of vehicles include, for example: a position sensor 536 such as an accelerometer, gyroscope and/or inertial measurement unit; a speed sensor 538; and an odometer sensor 540. The system 501 also may have a clock 542 that the system architecture uses to determine vehicle time during operation. The clock 542 may be encoded into s vehicle on-board computing device 512, it may be a separate device, or multiple clocks may be available. FIG. 5 will be described in combination with FIG. 6, which illustrates an example architecture of the on-board computing device 512.

The system 501 also may include various sensors that operate to gather information about the environment in which the vehicle is traveling. These sensors may include, for example: a location sensor 544 such as a global positioning system (GPS) device; object detection sensors such as one or more cameras 562, LADAR or LIDAR sensor system 564, and/or RADAR or SONAR system 566. The object detection sensors may be part of a computer vision system 560. The sensors 535 also may include environmental sensors 568 such as a precipitation sensor and/or ambient temperature sensor. The object detection sensors may enable the system 501 to detect objects that are within a given distance or range of the vehicle 301 in any direction, while the environmental sensors collect data about environmental conditions within the vehicle's area of travel. The system 501 will also include one or more cameras 562 for capturing images of the environment.

The system 501 may include a perception system that includes one or more sensors 535 that capture information about moving actors and other objects that exist in the vehicle's immediate surroundings. Example sensors include cameras, LADAR or LIDAR sensors and radar sensors. The data captured by such sensors (such as digital image, LADAR or LIDAR point cloud data, or radar data) is known as perception data. The perception system may include one or more processors, and computer-readable memory with programming instructions and/or trained artificial intelligence models that will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

During operations of the vehicle, information is communicated from the sensors to an on-board computing device 512. The on-board computing device 512 analyzes the data captured by the perception system sensors and, acting as a motion planning system, executes instructions to determine a trajectory of the vehicle. The trajectory includes pose and time parameters, and the vehicle's on-board computing device will control operations of various vehicle components to move the vehicle along the trajectory. For example, the on-board computing device 512 may control braking via a brake controller 522; direction via a steering controller 524; speed and acceleration via a throttle controller 526 (in a gas-powered vehicle) or a motor speed controller 528 (such as a current level controller in an electric vehicle); gears via a differential gear controller 530 (in vehicles with transmissions); and/or other controllers such as an auxiliary device controller 554. The on-board computing device 512 may include one or more communication links to the sensors 535.

The on-board computing device 512 may be implemented using hardware, firmware, software or a combination of any of these. For instance, the on-board computing device 512 may be implemented as part of a microcontroller, processor, and/or graphics processing units (GPUs). The on-board computing device 512 may include or interface with a register and/or data store 570 for storing data and programming instructions, which when executed, performs vehicle navigation based on sensor information, such as from cameras and sensors of a computer vision system. The on-board computing device 512 may perform one or more steps of the process 100.

The classifier 515 may be implemented using hardware, firmware, software or a combination of any of these. For instance, the classifier 515 may be implemented as part of a microcontroller, processor, and/or GPUs. The classifier 515 may include or interface with a register and/or data store 570 for storing data and programming instructions, which when executed, classifies the environment and detected objects, such as pedestrians, vehicles and objects, as described above. Additional details of the classifier 515 are provided below.

The trajectory planner 517 may be implemented using hardware, firmware, software or a combination of any of these. For instance, the trajectory planner 517 may be implemented as part of a microcontroller, processor, and/or GPUs. The trajectory planner 517 may include or interface with a register and/or data store 570 for storing data and programming instructions, which when executed, plans a trajectory 310 around the obstructed lane condition 305, based on sensor information, such as from cameras and sensors of a computer vision system.

The on-board computing device 512 may include or interface with a register and/or data store 570 for storing data and programming instructions, which when executed, performs object detection based on processed sensor information, such as from the computer vision system 560, and track stationary actors (i.e., stationary objects, stationary vehicles and stationary pedestrians) and moving actors (i.e., objects, vehicles and pedestrians) along a driven path by the vehicle 301.

The on-board computing device 512 may be used during the operation of the vehicle 301 such that actors captured along a driven path are extracted, identified, classified, located, and the motion of the actor is forecasted to avoid collusion of the vehicle 301 with any of the actors and control the navigation of the vehicle. An actor, object or vehicle may be determined to be stationary or have zero motion and zero direction. An actor, object or vehicle directly ahead of the vehicle may become an obstructed lane condition 305 for which the vehicle 301 may be permitted to perform a safe out-of-lane departure.

The on-board computing device 512 may perform machine learning 665 for planning the motion of the vehicle along a route from an origination location to a destination location of global coordinate system. The parameter may include, without limitation, motor vehicle operation laws of a jurisdiction (i.e., speed limits), objects in a path of the vehicle, scheduled or planned route, traffic lights of intersections, and/or the like. A motion planning module 520 in be configured to generate motion control signals may control acceleration, velocity, braking, and steering of the vehicle to avoid a collision on a route.

Geographic location information may be communicated from the location sensor 544 to the on-board computing device 512, which may then access a map of the environment that corresponds to the location information to determine known fixed features of the environment such as streets, buildings, stop signs and/or stop/go signals. The map includes map data 674. Captured images from the cameras 562 and/or object detection information captured from sensors such as a LADAR or LIDAR system 564 is communicated from those sensors) to the on-board computing device 512. The object detection information and/or captured images may be processed by the on-board computing device 512 to detect objects in proximity to the vehicle 301. In addition or alternatively, the vehicle 301 may transmit any of the data to a remote server system (not shown) for processing. Any known or to be known technique for making an object detection based on sensor data and/or captured images can be used in the embodiments disclosed in this document. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and one or more electronic devices in the vehicle's environment.

The on-board computing device 512 may obtain, retrieve, and/or create map data 674 (FIG. 6) that provides detailed information about the surrounding environment of the automated vehicle 301. The on-board computing device 512 may also determine the location, orientation, pose, etc. of the automated vehicle in the environment (localization) based on, for example, three-dimensional position data (e.g., data from a GPS), three dimensional orientation data, predicted locations, or the like. For example, the on-board computing device 512 may receive GPS data to determine the automated vehicle's latitude, longitude and/or altitude position. Other location sensors or systems such as laser-based localization systems, inertial-aided GPS, or camera-based localization may also be used to identify the location of the vehicle. The location of the vehicle 301 may include an absolute geographical location, such as latitude, longitude, and altitude as well as relative location information, such as location relative to other cars immediately around it which can often be determined with less noise than absolute geographical location. The map data 674 can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data 674 that provides information that assists the on-board computing device 512 in analyzing the surrounding environment of the automated vehicle 301. The map data 674 may also include information and/or rules for determining right of way of objects and/or vehicles in conflicted areas or spaces.

In certain embodiments, the map data 674 may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 512 may also include and/or may receive information relating to the trip or route of a user, real-time traffic information on the route, or the like.

The on-board computing device 512 may include and/or may be in communication with a routing controller 531 that generates a navigation route from a start position to a destination position for an automated vehicle. The routing controller 531 may access a map data 674 (FIG. 6) to identify possible routes and road segments that a vehicle can travel on to get from the start position to the destination position. The routing controller 531 may score the possible routes and identify a preferred route to reach the destination. For example, the routing controller 531 may generate a navigation route that minimizes Euclidean distance traveled or other cost function during the route, and may further access the traffic information and/or estimates that can affect an amount of time it will take to travel on a particular route. Depending on implementation, the routing controller 531 may generate one or more routes using various routing methods, such as Dijkstra's algorithm, Bellman-Ford algorithm, or other algorithms. The routing controller 531 may also use the traffic information to generate a navigation route that reflects expected conditions of the route (e.g., current day of the week or current time of day, etc.), such that a route generated for travel during rush-hour may differ from a route generated for travel late at night. The routing controller 531 may also generate more than one navigation route to a destination and send more than one of these navigation routes to a user for selection by the user from among various possible routes.

In various implementations, an on-board computing device 512 may determine perception information of the surrounding environment of the automated vehicle 301. Based on the sensor data provided by one or more sensors and location information that is obtained, the on-board computing device 512 may determine perception information of the surrounding environment of the automated vehicle 301. The perception information may represent what an ordinary driver would perceive in the surrounding environment of a vehicle. The perception data may include information relating to one or more objects in the environment of the automated vehicle 301. For example, the on-board computing device 512 may process sensor data (e.g., LADAR data, LIDAR data, RADAR data, SONAR data, camera images, etc.) in order to identify objects and/or features in the environment of automated vehicle 301. The objects may include traffic signals, road way boundaries, other vehicles, pedestrians, and/or obstacles, etc. The on-board computing device 512 may use any now or hereafter known object recognition algorithms, video tracking algorithms, and computer vision algorithms (e.g., track objects frame-to-frame iteratively over a number of time periods) to determine the perception. The perception information may include objects identified by discarding ground LIDAR point, as discussed below.

In some embodiments, the on-board computing device 512 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information. As discussed below in more detail, the on-board computing device 512 may also identify a lane being occupied by an object at any given time.

The on-board computing device 512 may perform one or more prediction and/or forecasting operations. For example, the on-board computing device 512 may predict future locations, trajectories, and/or actions of one or more objects. For example, the on-board computing device 512 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the automated vehicle 301, the surrounding environment, and/or their relationship(s). For example, if an object is a vehicle and the current driving environment includes an intersection, the on-board computing device 512 may predict whether the object will likely move straight forward or make a turn. If the perception data indicates that the intersection has no traffic light, the on-board computing device 512 may also predict whether the vehicle may have to fully stop prior to enter the intersection.

In various embodiments, the on-board computing device 512 may determine a motion plan via a motion planning module 520 for the automated vehicle. For example, the on-board computing device 512 may determine a motion plan for the automated vehicle based on the perception data and/or the prediction data. Specifically, given predictions about the future locations of proximate objects and other perception data, the on-board computing device 512 can determine a motion plan for the automated vehicle 301 that best navigates the automated vehicle relative to the objects at their future locations.

As discussed above, planning and control data regarding the movement of the automated vehicle is generated for execution. The on-board computing device 512 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, automated vehicles, aircraft, aerial drones and the like. An "automated vehicle" is a vehicle having a processor, programming instructions and drivetrain components that are controllable by the processor without requiring a human operator. An automated vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Automated vehicles also include vehicles in which autonomous systems augment human operation of the vehicle, such as vehicles with driver-assisted steering, speed control, braking, parking and other advanced driver assistance systems.

An "electronic device" or a "computing device" refers to a device that includes a processor and memory. Each device may have its own processor and/or memory, or the processor and/or memory may be conflicted with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory computer-readable medium where programming instructions and data are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LADAR system data, LIDAR system data, and/or other data.

The term "object," when referring to an object that is detected by a vehicle perception system or simulated by a simulation system, is intended to encompass both stationary objects and moving (or potentially moving) actors or pedestrians, except where specifically stated otherwise by terms use of the term "actor" or "stationary object."

In this document, when relative terms of order such as "first" and "second" are used to modify a noun, such use is simply intended to distinguish one item from another, and is not intended to require a sequential order unless specifically stated.

In addition, terms of relative position such as "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

What is claimed is:

1. A method, comprising:
    by one or more sensors of a perception system of an automated vehicle:
        obtaining data representative of an obstructed lane condition in a first lane traveled by the automated vehicle, and
        obtaining data representative of a moving actor in a second lane neighboring the first lane;
    by a processor of the automated vehicle:
        obtaining a trajectory of the automated vehicle around the obstructed lane condition, the trajectory including one or more locations in the second lane,
        defining a temporal horizon as a time period between a start time corresponding to a first point in time that the automated vehicle is predicted to enter the second lane when following the trajectory and an end time corresponding to a last point in time that the automated vehicle is predicted to be in the second lane when following the trajectory;
        for each of a plurality of times $t_n$ over the temporal horizon, determining a temporal margin by measuring an amount of time between a predicted state of the automated vehicle along the trajectory and a predicted state of the moving actor in which the moving actor is within a threshold distance from the automated vehicle,
        identifying a minimum temporal margin of the determined temporal margins,
        determining whether the minimum temporal margin is equal to or larger than a required temporal buffer, and
        if the minimum temporal margin is equal to or larger than the required temporal buffer, generating a motion control signal to cause the automated vehicle to follow the trajectory and veer around the obstructed lane condition into the second lane, otherwise generating a motion control signal to cause the automated vehicle to reduce speed or stop.

2. The method of claim 1, wherein when the minimum temporal margin is not equal to or larger than the required temporal buffer, generating the motion control signal comprises reducing speed of the automated vehicle while continuing to monitor the moving actor.

3. The method of claim 2, wherein continuing to monitor the moving actor comprises:
    determining updated temporal margins at each time to over an updated temporal horizon,
    identifying a updated minimum temporal margin of the updated temporal margins; and determining whether the updated minimum temporal margin is equal to or larger than the required temporal buffer.

4. The method of claim 1, further comprising determining the required temporal buffer as a function of a lateral distance that the automated vehicle may veer into the second lane.

5. The method of claim 4, further comprising also determining the required temporal buffer varies based on a speed of the automated vehicle.

6. The method of claim 1, further comprising, by the processor of the automated vehicle:
using the obtained data of the moving actor to classify the moving actor; and
using the obtained data of the obstructed lane condition to classify an object in the first lane is causing the obstructed lane condition.

7. The method of claim 6, wherein the planning of the trajectory includes:
determining a speed of the automated vehicle;
using the classification of the object in the first lane to determine a required clearance between a side of the object in the first lane and a side of the automated vehicle; and
planning the trajectory to maintain the required clearance between the object and the automated vehicle.

8. The method of claim 7, wherein the object in the first lane comprises one of:
a parked vehicle occupying at least a portion of the first lane;
a stationary object in the first lane; or
a stationary pedestrian in the first lane.

9. A control system for an automated vehicle, the system comprising:
sensors configured to capture data about an environment that is proximate the vehicle;
a processor; and
a non-transitory computer-readable medium comprising programming instructions that when executed by the processor, will cause the processor to:
receive, from the sensors, sensor data corresponding to an obstructed lane condition in the first lane being traveled by the automated vehicle;
receive, from the sensors, sensor data corresponding to a moving actor in a second lane neighboring the first lane;
obtain a trajectory of the automated vehicle around the obstructed lane condition, the trajectory including one or more locations in the second lane;
define a temporal horizon as a time period between a start time corresponding to a first point in time that the automated vehicle is predicted to enter the second lane when following the trajectory and an end time corresponding to a last point in time that the automated vehicle is predicted to be in the second lane when following the trajectory;
for each of a plurality of times $t_n$ over the temporal horizon, determine a temporal margin by measuring an amount of time between a predicted state of the automated vehicle along the trajectory and a predicted state of the moving actor in which the moving actor is within a threshold distance from the automated vehicle;
identify a minimum temporal margin of the determine temporal margins,
determine whether the minimum temporal margin is equal to or larger than a required temporal buffer, and
if the minimum temporal margin is equal to or larger than the required temporal buffer, generate a motion control signal to cause the automated vehicle to follow the trajectory and veer around the obstructed lane condition into the second lane, otherwise generate a motion control signal to cause the automated vehicle to reduce speed or stop.

10. The system of claim 9, further comprising programming instructions that will cause the processor to, when the minimum temporal margin is not equal to or larger than the required temporal buffer, cause the automated vehicle to reduce speed of the automated vehicle while continuing to monitor the moving actor.

11. The system of claim 10, wherein the programming instructions to cause the processor to continue to monitor the moving actor further comprise programming instructions to:
determine updated temporal margins at each time to over an updated temporal horizon;
identify an updated minimum temporal margin of the updated temporal margins; and
determine whether the updated minimum temporal buffer is equal to or larger than the required temporal buffer.

12. The system of claim 9, further comprising programming instructions that when executed by the processor, will cause the processor to determine the required temporal buffer as a function of a lateral distance that the automated vehicle may veer into the second lane.

13. The system of claim 12, further comprising programming instructions that when executed by the processor, cause the processor to also determine the required temporal buffer as a function of a speed of the automated vehicle.

14. The system of claim 9, further comprising, programming instructions that when executed by the processor, will cause the processor to:
use the obtained data of the moving actor to classify the moving actor; and
use the obtained data of the obstructed lane condition to classify an object in the first lane is causing the obstructed lane condition.

15. The system of claim 14, wherein the programming instructions that, when executed by the processor, will cause the processor to plan the trajectory further comprise programming instructions to:
determine a speed of the automated vehicle;
use the classification of the object in the first lane to determine a required clearance between a side of the object in the first lane and a side of the automated vehicle; and
plan the trajectory to maintain the required clearance between the object and the automated vehicle.

16. The system of claim 15, wherein the object in the first lane comprises one of:
a parked vehicle occupying at least a portion of the first lane;
a stationary object in the first lane; or
a stationary pedestrian in the first lane.

17. A non-transitory computer-readable medium that stores instructions that, when executed by at least one computing device, will cause the at least one computing device to perform operations comprising:
obtaining data representative of an obstructed lane condition in a first lane traveled by an automated vehicle;
obtaining data representative of a moving actor in a second lane neighboring the first lane;
obtaining a trajectory to guide the automated vehicle around the obstructed lane condition, the trajectory including one or more locations in the second lane;

defining a temporal horizon as a time period between a start time corresponding to a first point in time that the automated vehicle is predicted to enter the second lane when following the trajectory and an end time corresponding to a last point in time that the automated vehicle is predicted to be in the second lane when following the trajectory;

for each of a plurality of times to over the temporal horizon, determining a temporal margin by measuring an amount of time between a predicted state of the automated vehicle along the trajectory and a predicted state of the moving actor in which the moving actor is within a threshold distance from the automated vehicle;

identifying a minimum temporal margin of the determined temporal margins;

determining whether the minimum temporal margin is equal to or larger than a required temporal buffer; and if the minimum temporal margin is equal to or larger than the required temporal buffer, generating a motion control signal to cause the automated vehicle to follow the trajectory and veer around the obstructed lane condition into the second lane, otherwise generating a motion control signal to cause the automated vehicle to reduce speed or stop.

18. The non-transitory computer-readable medium of claim 17, wherein the at least one computing device is further caused to, when the minimum temporal margin is not equal to or larger than the required temporal buffer, generate the motion control signal comprises reducing speed of the automated vehicle while continuing to monitor the moving actor.

19. The non-transitory computer-readable medium of claim 17, wherein the at least one computing device is further caused to:

determine updated temporal margins at each time to over an updated temporal horizon;

identify an updated minimum temporal margin of the updated temporal margins; and determine whether the updated minimum temporal buffer is equal to or larger than the required temporal buffer.

20. The non-transitory computer-readable medium of claim 17, wherein the at least one computing device is further caused to determine the required temporal buffer as a function of a lateral distance that the automated vehicle may veer into the second lane.

* * * * *